United States Patent [19]

Schutze

[11] 4,077,202

[45] Mar. 7, 1978

[54] STARTING AN AIRCRAFT ENGINE AND DRIVING AUXILIARY, ON-BOARD EQUIPMENT

[75] Inventor: Horst Schutze, Leeste, Germany

[73] Assignee: Vereinigte Flugtechnische Werke-Fokker GmbH, Bremen, Germany

[21] Appl. No.: 680,687

[22] Filed: Apr. 27, 1976

[30] Foreign Application Priority Data

Apr. 30, 1975 Germany ............................ 2519152

[51] Int. Cl.² ................................................ F02C 7/26
[52] U.S. Cl. ................................... 60/39.14; 60/39.33
[58] Field of Search ............ 60/39.14, 39.15, 39.18 C, 60/39.07, 39.33; 244/53 A; 74/7 C

[56] References Cited

U.S. PATENT DOCUMENTS

| 2,777,301 | 11/1957 | Kuhn | 60/39.07 |
| 2,840,987 | 7/1958 | Bloomberg | 60/39.15 |
| 3,145,532 | 8/1964 | Moss | 60/39.14 |
| 3,416,309 | 12/1968 | Elmes et al. | 60/39.14 |
| 3,965,673 | 6/1976 | Friedrich | 60/39.15 |

*Primary Examiner*—Carlton R. Croyle
*Assistant Examiner*—L. J. Casaregola
*Attorney, Agent, or Firm*—Ralf H. Siegemund

[57] ABSTRACT

A gear box is provided with three inputs mutually decoupling each other so that neither can drive the other two via the gear box but either can drive secondary power sources such as a pump and a generator. The three inputs are respectively connected to an aircraft engine shaft, a starter-air turbine and a gas turbine, whereby additionally the starter turbine is connected to drive the shaft for starting but not vice versa. The air turbine receives air from the compressor of the gas turbine or otherwise. The shaft can be disconnected from the system.

8 Claims, 3 Drawing Figures

STARTING AN AIRCRAFT ENGINE AND DRIVING AUXILIARY, ON-BOARD EQUIPMENT

BACKGROUND OF THE INVENTION

The present invention relates to the starting of aircraft engines and to the driving of auxiliary on-board equipment.

The German printed patent application No. 1,928,235 describes a device for starting an aircraft engine by means of a hydrodynamic torque converter permitting particularly the driving of auxiliary equipment which, in turn, can be tested and if found operational, the engine is started while driving of the auxiliary equipment continues. This device, however, poses some problems because the control of the torque converter is quite cumbersome having to do with the volumetric efficiency.

The U.S. Pat. No. 3,416,309 discloses a starter motor which is driven by the hot exhaust gases developed by a gas generator, and the starter motor starts the engine via a gear box. This system is not suitable for testing the function of auxiliary equipment prior to starting the engine and to obtain a changeover to the engine as equipment drive without interrupting operation of the equipment.

The U.S. Pat. No. 3,660,977 discloses an on-board emergency power source, wherein particularly a monocomponent fuel is used to develop propulsion gas for driving a turbine which, in turn, drives an hydraulic pump via a suitable gear. This particular patent is not concerned with starting of an engine but relates exclusively to the production of hydraulic power in the case of equipment failure leading to the drop out of the regular hydraulic power source.

U.S. Pat. No. 2,777,301 discloses an air conditioning system integrated in a device for starting an aircraft engine using air tapped from the compressor of an auxiliary gas turbine. The particular device is exclusively designated for producing mechanical motor power to the engine for starting it.

DESCRIPTION OF THE INVENTION

It is an object of the present invention to provide for a system outlined above, for starting an aircraft engine and for driving auxiliary equipment which permits driving the auxiliary equipment prior to starting the engine so that these pieces of equipment can be tested and which system subsequently starts the engine without interruption of the driving of the auxiliary equipment.

It is a further object of the present invention to provide for such a system supplemented with means for providing emergency power to the auxiliary equipment and which also permits restarting the engine.

In accordance with the preferred embodiment of the present invention, it is suggested to provide an auxiliary machine such as a gas turbine, for producing rotational power as well as pressurized gas. In addition, an air turbine is to be connected pneumatically to the auxiliary machine to receive therefrom compressed gas. The system includes a gear box means which is permanently connected to pieces of auxiliary equipment (secondary power sources) such as an hydraulic pump and an electric generator. The auxiliary machine means, the air turbine and the shaft of the aircraft engine are connected to the gearing means via suitable clutch means so that either the auxiliary machine means or the engine shaft (but not both) can drive the auxiliary equipment via the gear box, and the air turbine can drive the engine shaft but not vice versa. The air turbine is preferably additionally connectible to an emergency source for gas and/or a ground source for pressurized air.

The clutch means preferably includes three override clutches, one for connecting the auxiliary machine, i.e., the gas turbine to the gear box so that the gas turbine can drive the gear but may not be driven therefrom. A second override clutch connects the air turbine to the engine shaft preferably via a reducing gear so that the air turbine can drive the engine shaft but cannot be driven therefrom. The third override clutch connects the gear box to the engine shaft so that the engine shaft can drive the gear but cannot be driven from and through the gear. In addition, it may be advisable to connect a controllable clutch between the engine shaft proper and a shaft that is being driven by the air turbine and will drive the particular (third) override clutch that can drive the gear.

It can thus be seen that the air turbine being supplied with pressurized air, for example, from the compressor of the gas turbine or otherwise is considerably easier to control than for example a torque converter as used in the prior art. Moreover, the air turbine lends itself readily to being supplied with pneumatic power from different sources, one of them is, of course, the compressor stage of the gas turbine but, in the alternative, the air turbine may be supplied with pressurized air from a ground source of pressurized air and the third alternative is the above-mentioned emergency gas generator, for example, a monofuel gas generator. The connect-disconnect clutch in the shaft means of the engine permits the air turbine to drive the secondary power source (generator, pump) without starting the engine. This may become necessary if the engine and the gas turbine have failed and if an attempt to restart the engine was unsuccessful.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

Proceeding now to the detailed description of the drawings, FIG. 1 shows an aircraft engine 1 having a particular shaft 2 which leads into a gear box having a casing 3 and three gears 9, 10, and 11. The shaft 2 is connected to the gear 11 via an override clutch 15 which is constructed so that the shaft 2 can drive the gear 11 but cannot be driven by the gear 11.

Figure 1:
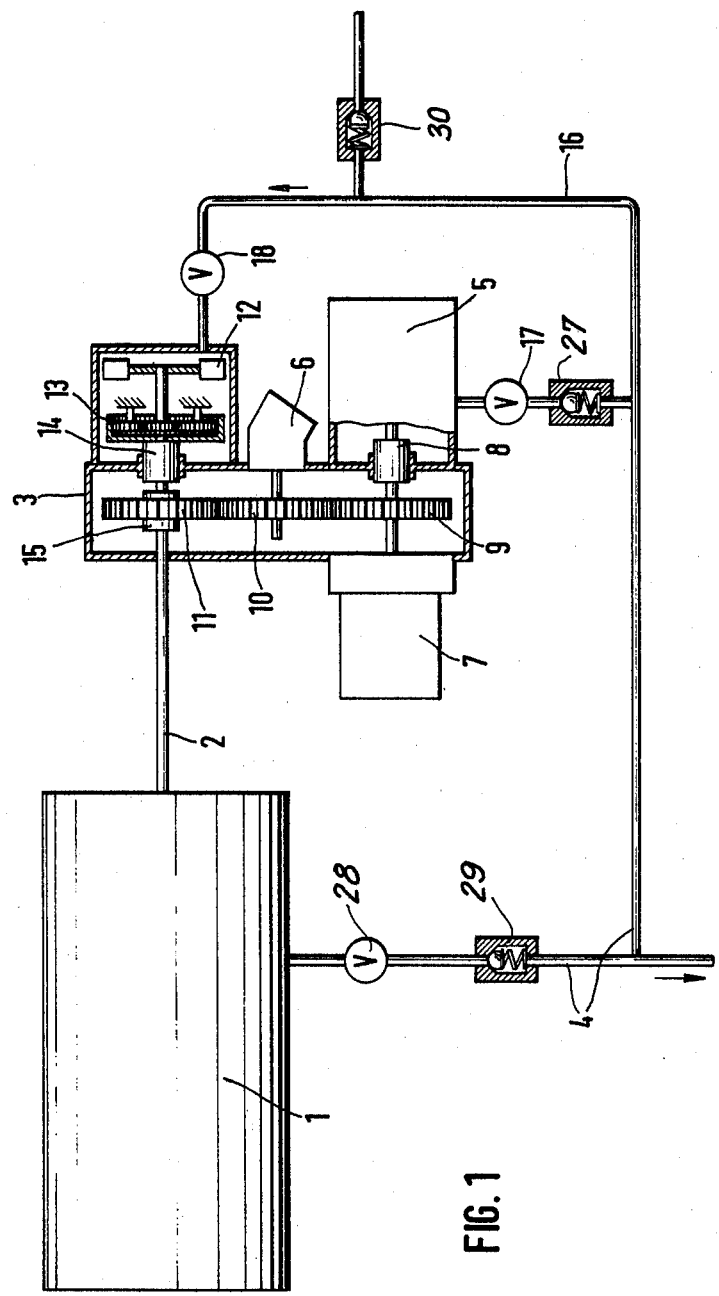
FIG. 1 is a block diagram of a starter device in accordance with the preferred embodiment of the present invention but without emergency power plant.

The aircraft engine 1 has, of course, the usual compressor, and this compressor is tapped via a valve 28 and a check valve 29 leading to a branched conduit 4. Various users for the compressed air are connected or can be connected to that branch line as indicated by the arrow.

This means that the various users (not shown) can be supplied with auxiliary air from various sources. Another such source is an auxiliary gas turbine 5 being the auxiliary machine which provides rotational power and pressurized air by operation of its compressor.

A valve 17 is provided to permit the flow of pressurized air from turbine 5 into the branch system 4. In addition, air from the compressor of the gas turbine 5 can pass into a branch line 16 for use to be discussed shortly.

The gas turbine 5 is one of the devices which supplies rotational power to the gear train. The gas turbine casing is connected (flanged) to the casing 3 while the drive shaft of the gas turbine is connected to the gear 9. In particular, the gas turbine 5 is coupled to the gear box via the one-way override clutch 8 so that the gas turbine can drive the gear 9 and the gear train as a whole, but the gear train cannot drive the gas turbine.

The casing 3 carries on-board auxiliary equipment which also can be described as secondary power sources such as a hydraulic pump 6 and an electric generator 7. These auxiliary machines and secondary power sources are driven by the gear box from whatever source for motor power is used to drive the gear train. One of these sources is the auxiliary gas turbine 5 which thus produces directly rotational and pneumatic power and indirectly electrical and hydraulic power. In addition, however, the auxiliary devices 6 and 7 can be driven by the engine shaft 2 via override clutch 15 as coupling shaft 2 to gear 11. However, the clutches 15 and 8 prevent shaft 2 and gas turbine 5 from mutually driving each other.

A third source for rotational power is an air turbine 12 having its rotary output immediately connected to a speed reducing gear 13 whose output side in turn is connected to the shaft 2 via an override clutch or coupling 14. The clutch is constructed and the connection is made so that the air turbine 12 can drive the shaft 2 via the reducing gear 13 and the override clutch 14, but the engine shaft 2 cannot drive the air turbine 12.

The air turbine 12 is now connected to the tap line 16 to receive for example compressed air from the compressor of the gas turbine 5. The connection leads via a check valve 27 and a control, i.e., pressure reducing valve 18. The figure shows in addition an alternative source for pressurized air for driving the air turbine 12. This alternative feeder path leads for example to a ground source of pressurized air via a check valve 30 so that the engine when turbine 5 fails can be started by a ground air supplier.

The inventive system as described operates as follows: For testing the on-board auxiliary equipment such as the hydraulic pump 6 and the electric generator 7, the gas turbine 5 is started whereupon it drives the gear train 9, 10, 11 via the clutch 8. The machines 6 and 7 are driven accordingly and the proper function of the hydraulic and electric systems can now be tested. The gear train is driven as a whole but gear 11 idles because clutch 15 will not transmit rotational power upon shaft 2.

Upon satisfactory completion of the equipment test, engine 1 is to be started. For this, valves 17 and 18 are opened and the air turbine 12 is driven through the air tapped from the compress of turbine 5 which continues to run and which particularly continues to drive the secondary power sources 6 and 7. It should be noted that the particular arrangement of the check valve 27 permits indeed air flow from the compressor of the gas turbine 5 to the air turbine 12.

As soon as the air turbine 12 starts to run it drives the reducing gear 13 and provides rotational power to the shaft 2 via override clutch 14. Thus, engine 1 is now being started. The power output of turbine 12 is controlled by means of pressure reducing valve 18.

After engine 1 has been started successfully, it drives the shaft 2, and clutch 14 blocks transfer of motive power to the air turbine 12 which will indeed be shut off automatically. Clutch 14 transmits power only when its outer part does not run slower than its inner part. On the other hand, the particular override clutch 15 is constructed the other way in that it transmits mechanical power when its inner part being seated on shaft 2, does not run slower than the outer part which is connected to the gear 11.

Following successful starting, engine 1 drives the gear train 11, 10, and 9 and, therefore, machines 6 and 7 are now being driven through the engine shaft. On the other hand, clutch 8 prevents turbine 5 from being driven by the engine 1 via the gear box. Therefore, the gear train is decoupled from the gas turbine which also can be shut down. After successful engine start, the air supply from gas turbine 5 to the air turbine 12 will be interrupted by either or both valves 17 and 18. It can readily be seen that the pneumatic connection via valve 19 permits an alternative engine start by a ground source of pressure for driving the air turbine 12.

Should for some reason or another, engine 1 drop out during flight, an attempt to restart it can be made by starting the gas turbine 5 anew so that the auxiliary equipment continues to receive power, and the air turbine 12 will now attempt to restart the engine using the compressed air from the gas turbine 5 in exactly the same manner as described.

Figure 2:
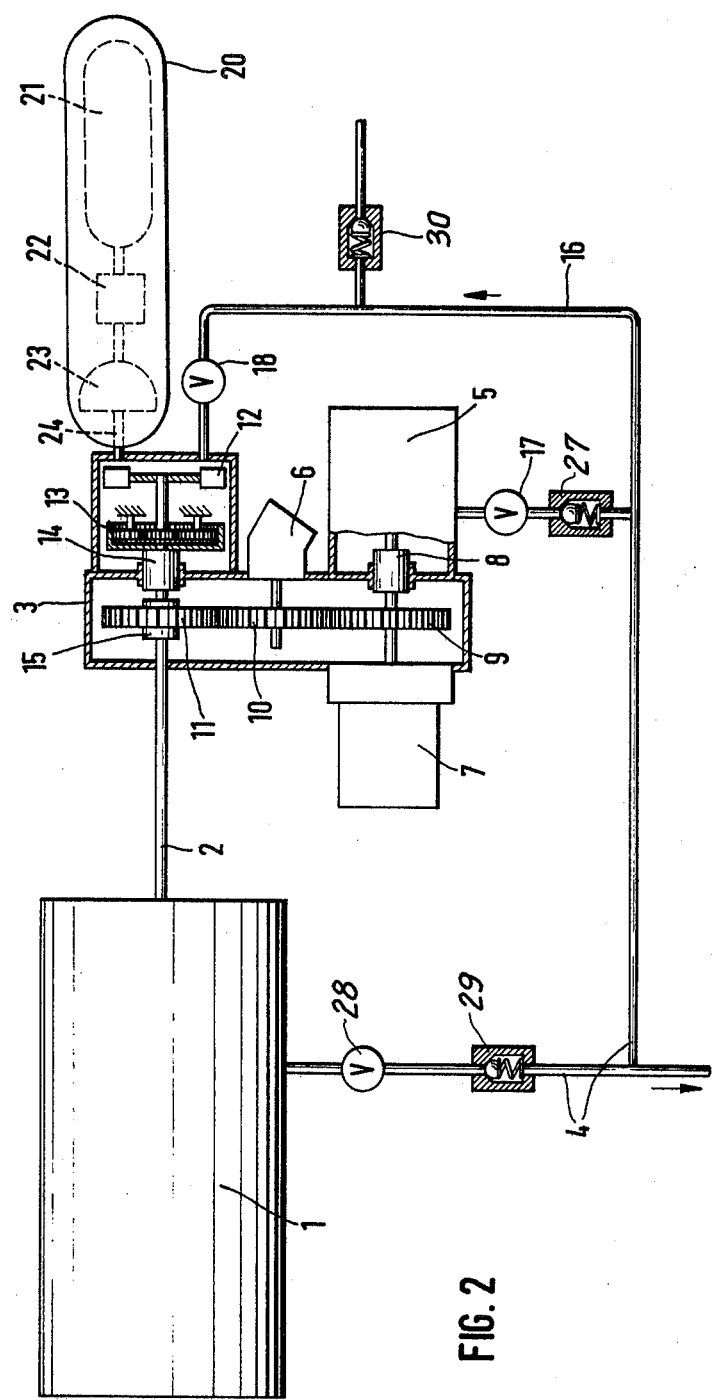
FIG. 2 is a block diagram of the same device as shown in FIG. 1 but being supplemented with an emergency power plant.

FIG. 2 shows an extension of the system as described thus far and, therefore, includes all the parts as described with reference to FIG. 1. FIG. 2, however, shows in addition that the air turbine 12 can be fed with a propulsion gas derived from a second source, namely, the emergency gas source 20. This particular emergency power pack consists of a tank 21 holding a monocomponent fuel, for example, hydrazine. A pressure regulating valve 22 controls the flow of hydrazine to a reaction and decompositioning chamber 23 in which the monofuel, for example the hydrazine, decomposes by an exothermic process and into a rather high-powered propulsion gas. This gas is used or can be used to drive the turbine 12 via line or connection 24. The need for using the emergency power pack in this fashion arises if both, the engine 1 and the auxiliary gas turbine 5 have dropped out. This source of gas permits restarting the engine 1 in flight.

Figure 3:
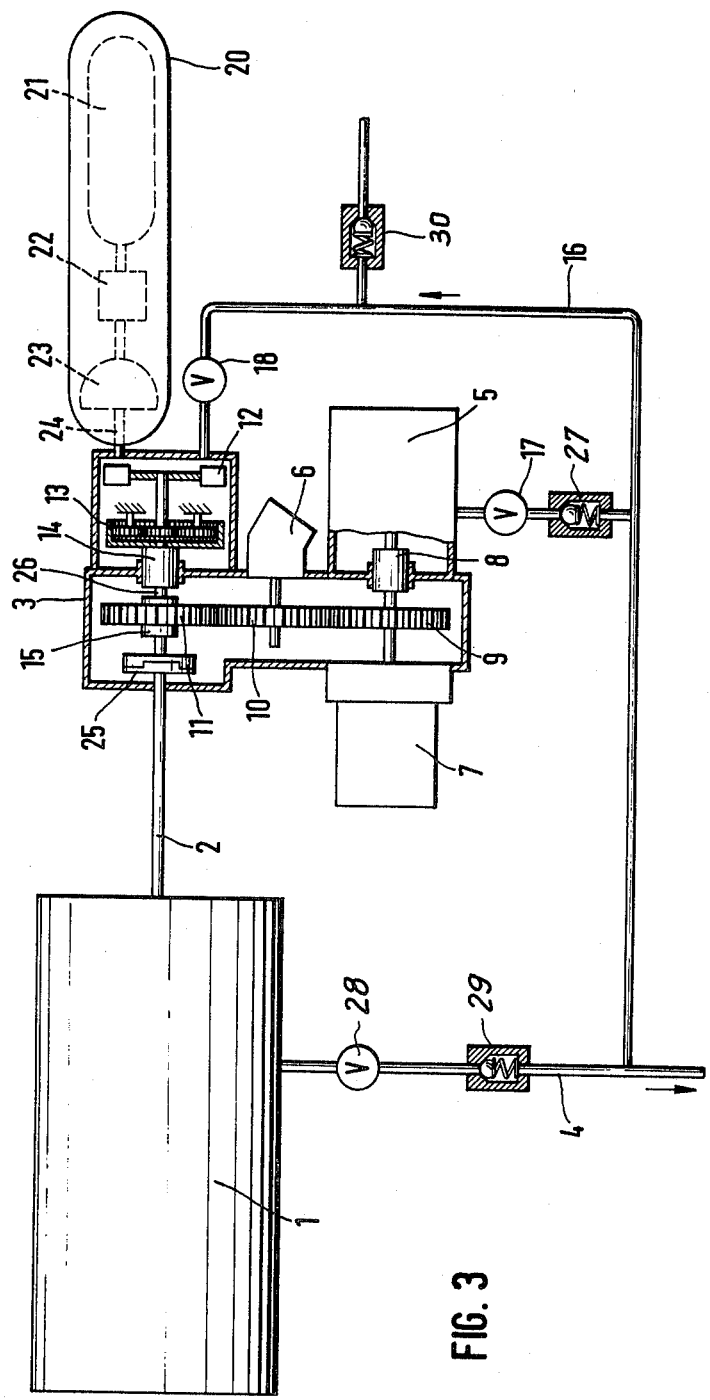
FIG. 3 is a block diagram of a device similar to the one shown in FIG. 2 and being still further supplemented by a connect-disconnect clutch.

Turning now to FIG. 3, again all of the parts shown in FIG. 2 are also shown here but the figure includes additionally a controllable or connect-disconnect clutch 25 being for example constructed as a jaw clutch to interrupt, so to speak, the connection of engine shaft 2 to the equipment as described. A shaft 26 serves as continuation of the engine shaft when the clutch connects. Shaft 26 itself is connected to the gear 11 via the particular override clutch 15 as well as the override clutch 14. This way one can actually drive the auxiliary equipment pieces 6 and 7 through the air turbine 12 without at the same time starting the engine 1. This situation represents an extreme case of emergency when, for example, the gas turbine 5 has also dropped out and cannot be restarted. In other words, the situation may have been that engines 1 and 5 dropped out and the emergency power pack 20 drives turbine 12 for attempting to restart the motor. Already at this point turbine 12 will drive the secondary power sources 6 and 7, because shaft 26 can drive gear 11 via clutch 15 when the gear train is not driven by the gas turbine. If the attempt to restart engine 1 fails, coupling 25 disconnects and the air turbine (now propelled by hydrazine decompositioning products) will at least drive the auxiliary and secondary power sources 6 and 7 so that hydraulic and electrical power is still available, for example, for maintaining maneuverability of the craft.

The invention is not limited to the embodiments described above but all changes and modifications thereof not constituting departures from the spirit and scope of the invention are intended to be included.

I claim:

1. Apparatus for starting an aircraft engine, having a shaft, and for driving auxiliary equipment such as a pump, a generator, etc., comprising:
   an auxiliary machine means for producing rotational power as well as compressed gas;
   an air turbine for starting the engine;
   pneumatic conduit means for connecting the machine means to the turbine for driving the turbine with compressed gas as produced by the machine means while driving the auxiliary equipment prior to and during starting of the engine;
   gear means drivingly connected to said auxiliary equipment;
   clutch means for connecting said machine means and said shaft to said gear means so that either can drive said auxiliary equipment but neither of said machine means and said shaft drives the respective other one; and
   further clutch means connecting said engine shaft to said turbine so that said air turbine can drive said shaft for obtaining starting of the engine but said shaft cannot drive said turbine.

2. Apparatus as in claim 1 wherein said further clutch means includes a first override clutch for drivingly connecting said air turbine to said shaft, said clutch means including a second override clutch for connecting said shaft to said gear means, and a third override clutch for connecting said machine means to said gear means.

3. Apparatus as in claim 1 and including an emergency gas supply for driving the air turbine.

4. Apparatus as in claim 3 wherein said emergency gas supply includes a source of monocomponent fuel and a decompositioning chamber for the fuel to produce gas for running the air turbine.

5. Apparatus as in claim 1 and including a connect-disconnect clutch in said shaft, the first part of said shaft leading directly to the engine means, a second part of said shaft being connected to said clutch means.

6. Apparatus as in claim 1 and including control means in said conduit means for controlling said air turbine.

7. Apparatus for starting an aircraft engine having a shaft, and for driving auxiliary equipment such as a pump and a generator, comprising
   a gas turbine having a compressor; means including an override clutch for connecting the turbine to said pump and said generator;
   an air turbine;
   means including a second override clutch for connecting the air turbine to the engine shaft so that the turbine can drive the shaft, but the shaft will not drive the air turbine;
   means including a third override clutch for connecting the shaft to the pump and the generator, so that the shaft and the gas turbine cannot mutually drive each other; and
   pneumatic means for connecting the compressor of the gas turbine to said air turbine.

8. Apparatus as in claim 7, and including a connect-disconnect coupling for separating the shaft from the air turbine, so that the air turbine can also drive the pump and the generator.

* * * * *